US007701609B2

(12) United States Patent
Yoshida

(10) Patent No.: US 7,701,609 B2
(45) Date of Patent: Apr. 20, 2010

(54) IMAGE RECORDER

(75) Inventor: Naoki Yoshida, Tokyo (JP)

(73) Assignee: WEDG Co., Ltd., Tokyo (JP)

( * ) Notice: Subject to any disclaimer, the term of this patent is extended or adjusted under 35 U.S.C. 154(b) by 1457 days.

(21) Appl. No.: 10/525,525

(22) PCT Filed: Jan. 31, 2003

(86) PCT No.: PCT/JP03/01015

§ 371 (c)(1),
(2), (4) Date: Feb. 24, 2005

(87) PCT Pub. No.: WO2004/067284

PCT Pub. Date: Aug. 12, 2004

(65) Prior Publication Data

US 2006/0152743 A1 Jul. 13, 2006

(51) Int. Cl.
*G06K 15/10* (2006.01)
*G06F 3/12* (2006.01)

(52) U.S. Cl. ........................................ 358/1.5; 358/1.1

(58) Field of Classification Search .................. 358/1.1, 358/1.9, 1.5, 1.2, 1.3, 1.4, 1.6, 1.7, 1.8, 1.12, 358/1.15, 1.13, 1.14, 1.16, 1.17, 1.18, 296, 358/3.29, 1.11, 407, 468, 488, 490, 489; 399/1, 2, 299, 303, 304, 305, 328, 330, 331; 347/171, 172, 186, 191, 2, 3, 5, 14, 23
See application file for complete search history.

(56) References Cited

U.S. PATENT DOCUMENTS 5,062,723 A * 11/1991 Takeda et al. ............ 101/407.1
5,529,413 A * 6/1996 Kamikubota et al. ........ 400/582

FOREIGN PATENT DOCUMENTS

| | | |
|---|---|---|
| JP | 05-057970 | 3/1993 |
| JP | 06-206326 | 7/1994 |
| JP | 2000-191183 | 7/2000 |

* cited by examiner

*Primary Examiner*—Dov Popovici
(74) *Attorney, Agent, or Firm*—Bacon & Thomas, PLLC

(57) ABSTRACT

A sheet is wound up on a frictional carrier drum having a circumferential length longer than a sheet length so that the length of the wound-up sheet is a quarter or more of the circumferential length, and contact elements for pressing the sheet against the frictional carrier drum are provided at four or more positions around the frictional carrier drum so as not to generate a slip of the sheet, whereby it is possible to prevent a slip between the sheet and the frictional carrier drum, and it is also possible to prevent the superposition deviation of colors in a transfer process repeated several times.

19 Claims, 18 Drawing Sheets

RELATIONSHIP BETWEEN FRICTION COEFFICIENT RATIO, NUMBER OF PRINTED SHEETS, AND PRINT RESIST DEVIATION

| FRICTION COEFFICIENT RATIO (%) % | FIRST PRINTED SHEET μm | TWENTY-FIFTH PRINTED SHEET μm | FIFTIETH PRINTED SHEET μm | ALLOWABLE DEVIATION μm |
|---|---|---|---|---|
| 10 | 0 | 15 | 40 | 75 |
| 30 | 5 | 20 | 60 | 75 |
| 50 | 30 | 50 | 120 | 75 |

RELATIONSHIP BETWEEN FRICTION COEFFICIENT RATIO, NUMBER OF PRINTED SHEETS, AND PRINT RESIST DEVIATION

RELATIONSHIP BETWEEN PLATEN-DRUM WINDING ANGLE, NUMBER OF PRINTED SHEETS, AND PRINT RESIST DEVIATION

| PLATEN-DRUM WINDING ANGLE deg | FIRST PRINTED SHEET μm | TWENTY-FIFTH PRINTED SHEET μm | FIFTIETH PRINTED SHEET μm | ALLOWABLE DEVIATION μm |
|---|---|---|---|---|
| 45 | 20 | 60 | 120 | 75 |
| 90 | 5 | 20 | 60 | 75 |
| 135 | 0 | 10 | 40 | 75 |

(a)

(b)

(c)

(d)

(a)

(b)

(c)

IMAGE RECORDER

TECHNICAL FIELD

The present invention relates to an image recording apparatus for forming an image by transferring a color material on a recording medium, and specifically to an image recording apparatus in which a positional deviation between a recording medium and an image position in a multi transfer process can be prevented.

BACKGROUND ART

In recent, with the spread of digital cameras, the need of printing out color digital images has been increased. Various methods have been suggested for printing the color digital images. For example, thermal transfer printers, such as dye sublimation printers using a thermal head, can perform print representations by means of concentration gradation similar to conventional silver salt printers, so that printed matter extremely close to silver salt photographs can be obtained. Further, since they can be miniaturized without using liquids, such as chemicals, the thermal transfer printers have been paid attention to as printers providing silver salt photographs at home.

FIG. 1 shows a structural diagram of an important part of a thermal transfer color printer. The thermal transfer color printer comprises, as primary components, a thermal transfer ribbon 1, sheets 2, a platen drum 3, a thermal head 4, a clamper 5, a platen drum driving motor 6, a sheet hopper 7, a head lifting mechanism 19, etc. A friction member 8, such as rubber, is attached to a contact portion between the clamper 5 and a sheet 2.

In a transfer (or printing) area shown in FIG. 1, the thermal head 4, the thermal transfer ribbon 1, the sheet 2, and the platen drum 3 are arranged from an outer circumference side to an inner circumference side in a radial direction of the platen drum 3 such that the sheet 2 is sandwiched and held. The thermal transfer ribbon 1 is separated by color and is wound up such that a combination of a plurality of color materials periodically appears. For example, three colors of yellow, magenta, and cyan constitute a group. In addition to these colors, a ribbon to which black or a transparent overcoat material for coating a surface is added is prepared.

Now, a series of operations of the printer for forming a full color image on a sheet will be described with reference to an example using a three-color ribbon.

First, an arbitrary color of the thermal transfer ribbon 1 is cued. Next, the thermal head 4 is moved upward by means of the lifting mechanism 19 to be separated from the surface of the platen drum 3, and the sheet 2 is fed from the sheet hopper 7 by a sheet feed roller 18. The sheet 2 is guided by a sheet feed guide at an entrance, and is carried up to a position of the clamper 5 along the outer circumference of the platen drum 3. Next, the platen drum 3 and the clamper 5 apply insertion pressure to the carried sheet 2 to hold it. An underside surface, that is, a portion of the clamper 5 in contact with the sheet 2 is provided with the friction member 8, such as rubber, and holds the sheet 2 so as not to deviate (so as not to slip) from the platen drum 3. After the sheet 2 has been held, in order to keeping the thermal transfer ribbon 1 in close contact with the sheet 2, the head lifting mechanism 19 moves the thermal head 4 toward the platen drum 3 and to make close contact of the thermal head with the sheet 2.

Next, the driving motor 6 for the platen drum 3 is driven to rotate the platen drum 3, and thus moves the sheet 2 to be wound up on the platen drum 3. In synchronism with the movement of the sheet, electrical signals corresponding to an image having a first color are supplied to a minute heating element group of the thermal head 4 from a control unit (not shown). The minute heating elements generate heat corresponding to arbitrary dots constituting pixels of the image. Through this heating, the color material of the thermal transfer ribbon 1 is transferred to the sheet 2, and the image having a predetermined color is formed on the sheet 2.

After the first color transfer is finished, the head lifting mechanism 19 releases the pressing force of the thermal head 4 against the sheet 2, and moves the thermal head 4 to a separated position 4' from the outer circumferential surface of the platen drum 3, so that the clamper 5 can pass therebetween. The platen drum 3 is rotated by means of the driving motor 6 to locate the front end of the sheet 2 at a predetermined position, and the thermal transfer ribbon 1 is reeled out to cue the next color.

Next, the driving motor 6 is driven to rotate the platen drum 3, so that the sheet 2 is rotated together with the platen drum 3. In synchronism with the rotatory movement of the sheet, electrical signals corresponding to a second color are supplied to the minute heating element group of the thermal head 4 from the control unit (not shown). The minute heating elements generate heat corresponding to arbitrary dots constituting pixels of the image. Through the heating, a second color material of the thermal transfer ribbon 1 is transferred onto the first color material, thereby forming an image having a mixed color of the first color and the second color on the sheet 2. In this way, by repeating the transfer process of color materials as many times as necessary colors, a color image is formed on the sheet 2.

However, conventionally, in order to prevent the slip of the sheet 2, the front end of the sheet 2 was held by the clamper 5. For this reason, as shown in FIG. 2, a large non-transfer (non-printing) area is generated in a section 2*a* of the sheet 2 between the clamper 5 and the thermal head 4, so that the transfer process cannot be performed to the entire surface of the sheet. The non-transfer area should be cut out later, so that a relatively expensive thermal transfer photograph sheet can be wasted. A positional deviation of a transfer position of the transfer image or a blur of the transfer image may be generated due to the contamination of the clamper 5 or depending upon the kind of a sheet.

Therefore, it is an object of the present invention to provide an image recording apparatus allowing a printing to be performed on the entire area of a sheet without an edge, as an image recording and output apparatus such for a digital camera, etc.

It is another object of the present invention to provide an image recording apparatus capable of suppress the generation of the slip of a recording medium due to the contamination or deterioration or abrasion of a friction member of a clamper, or depending upon the kind of the recording medium.

DISCLOSURE OF INVENTION

In order to accomplish the above objects, according to an aspect of the present invention, there is provided a thermal transfer type image recording apparatus for forming an image on a sheet-shaped recording medium using a thermal head, the image recording apparatus comprising: a frictional carrier drum that has an outer circumference larger than the length of the recording medium in a feed direction and is rotated corresponding to a thermal transfer process, the entire surface or the substantially entire surface of at least a portion thereof with which the recording medium comes in contact being covered with an elastic member, such as rubber; a recording medium guiding mechanism for guiding the recording medium toward the frictional carrier drum; and one or more auxiliary carrier members for keeping at least a part of the recording medium in close contact with the frictional carrier drum and for feeding the recording medium together with the frictional carrier drum, wherein a friction coefficient between the frictional carrier drum and the recording medium and a friction coefficient between the recording medium and the auxiliary carrier members are set such that a slip generated between the recording medium and the frictional carrier drum is kept within the allowable range.

According to this construction, the slip of the recording medium on the frictional carrier head can be prevented. Therefore, it is possible to stably carry the recording medium. Further, the blur of colors is prevented even if a multi-color printing is performed.

According to another aspect of the present invention, there is provided a thermal transfer type image recording apparatus for forming an image on a sheet-shaped recording medium using a thermal head, the image recording apparatus comprising: a frictional carrier drum that has a friction member having an outer circumference larger than the length of the recording medium in a feed direction and is rotated corresponding to a thermal transfer process; a recording medium guiding mechanism for guiding the recording medium to be fed toward the frictional carrier drum; one or more auxiliary carrier members for keeping at least a part of the recording medium into contact with the frictional carrier drum to make sure of movement of the recording medium together with the frictional carrier drum; a detector for detecting whether the recording medium passes through a predetermined position; and output control means for allowing the thermal head to generate heat in accordance with the output of the detector.

According to this construction, since transfer start timing can be determined from a point of time when the position of the recording medium is detected, only a slip for a time interval from the detection timing to the transfer start timing constitutes a transfer deviation. Therefore, it is possible to reduce an influence range of the slip of the recording medium. Furthermore, on the basis of position data of the recording medium wound up around the frictional carrier drum, which are obtained by detecting an end of the recording medium, the power supply start position of the thermal head can be changed to electrically correct a minute deviation, so that it is possible to perform printing without a blur of colors.

Preferably, the image recording apparatus according to the present invention further comprises a head moving mechanism for allowing the thermal head to go forward and backward between a contact position with the frictional carrier drum and a separate position therefrom, and motion control means for moving an upper head moving mechanism on the basis of the output of the detector. As a result, the contact between the thermal head and the recording medium can be avoided in a non-transfer process, so that it is possible to prevent the slip of the recording medium.

It is preferable that the image recording apparatus further comprise a ribbon passing through between the thermal head and the frictional carrier drum, wherein the thermal head heats the ribbon and transfers a color material from the ribbon to the recording medium. As a result, it is possible to construct a sublimation-type thermal transfer printer.

It is also preferable that a ratio of the friction coefficient between the recording medium and the auxiliary carrier members to the friction coefficient between the friction carrier drum and the recording medium is set to be 35% or less. As a result, the slip of the recording medium in frictionally carrying the recording medium can be remarkably decreased.

It is also preferable that a close contact length between the recording medium and the frictional carrier drum be a quarter or more of an outer circumference of the frictional carrier drum. As a result, the slip of the recording medium in frictionally carrying the recording medium can be remarkably decreased.

Preferably, the auxiliary carrier members are formed at four or more positions on the frictional carrier drum. Furthermore, it is possible to rotatably move the recording medium while the close contact length between the recording medium and the frictional carrier drum is a quarter or more of the outer circumference of the frictional carrier drum.

Preferably, the detector is provided close to the thermal head. As a result, a distance between the detector and the thermal head can be made shorter, so that it is possible to decrease the slip within the distance.

It is also preferable that, after the output from the detector, the output control means allow the thermal head to generate heat after time corresponding to a distance from the detector to the thermal head passes. As a result, it is possible to more accurately set an image transfer start position on the recording medium to a predetermined position.

It is also preferable that the output control means predict the slip of the recording medium with reference to at least one of the kind and size of the recording medium, and an increase and decrease in tension of the ribbon, and finely adjust the heating timing of the thermal head based on the slip. As a result, it is possible to further adjust a difference in minute slip varying by a recording medium.

It is also preferable that the output control means estimate the increase and decrease in tension of the ribbon based on a pulse period of an encoder operatively associated with the amount of the ribbon taken out, and predict the slip in accordance with the increase and decrease in tension of the ribbon. As a result, it is possible to reflect an influence of a slip of the ribbon in contact with the recording medium at the transfer start timing.

It is also preferable that the output control means predict the slip with reference to a data table previously stored. By previously storing the relationship between the tension of the ribbon and the slip of the recording medium, it is possible to occasionally adjust the slip corresponding to the tension of the ribbon.

The recording medium may include a thermal transfer dedicated paper, a normal paper, a label paper, a transparent film, a thermal recording paper, and a thermal color recording paper. The present invention can be applied to a thermal recording type recording medium as well as a sublimation-type thermal transfer recording medium.

The auxiliary carrier members may include plate-shaped or spiral-shaped elastic members. As a result, biasing force is applied to the auxiliary carrier member, thereby keeping the recording medium in close contact with the friction carrier drum.

The auxiliary carrier member may further comprise a function of guiding the movement of the recording medium in the rotary direction of the frictional carrier drum. As a result, it is possible to smoothly move the recording medium in the circumferential direction of the frictional carrier drum.

The auxiliary carrier member may set pressure for keeping the recording medium in close contact with the frictional carrier drum, in accordance with the kind of the recording medium. As a result, by keeping the recording medium in close contact with the frictional carrier drum with pressure suitable for the recording medium, it is possible to accomplish both of the prevention of a slip and the prevention of wrinkles or folded jams of the recording medium.

It is also preferable that the auxiliary carrier member should change pressure to keep the recording medium in close contact with the frictional carrier drum. As a result, pressing force suitable for the recording medium can be arbitrarily set.

It is also preferable that a link mechanism is further provided for setting in common pressure of the plurality of auxiliary carrier members for keeping the recording medium in close contact with the frictional carrier drum. As a result, it is possible to simultaneously set the pressing forces of the auxiliary carrier members.

It is also preferable that the link mechanism is a pressing mechanism having a ring shape, and comprises a ring-shaped member capable of rotating in the circumferential direction, in which a plurality of cam surfaces is formed on an inner circumference of the ring-shaped member, a plurality of elastic members for generating biasing force for pressing the plurality of auxiliary carrier members toward the frictional carrier drum, respectively, and a plurality of cam followers which is moved in a diametrical direction of the ring-shaped member along the plurality of cam surfaces, respectively, and which sets the biasing force to a plurality of steps by expanding and compressing the respective elastic members. As a result, by setting a rotation position (a rotation angle) of the ring-shaped member, the expansion and compression of the respective elastic members can be set, so that it is possible to set the biasing forces of the respective auxiliary carrier members in common.

More preferably, the link mechanism comprises elastic members for generating biasing force for pressing the plurality of auxiliary carrier members arranged around the frictional carrier drum against the frictional carrier drum, respectively, a plurality of levers which is rotatably arranged in the vicinity of the plurality of auxiliary carrier members and which expands and compresses the elastic members, and one or more connecting members for mutually connecting the levers. As a result, by setting positions of the connecting members (or levers), the expansion and compression of the respective elastic members can be set, so that it is possible to set the biasing forces of the auxiliary carrier members in common.

BEST MODE FOR CARRYING OUT THE INVENTION

Figure 1:
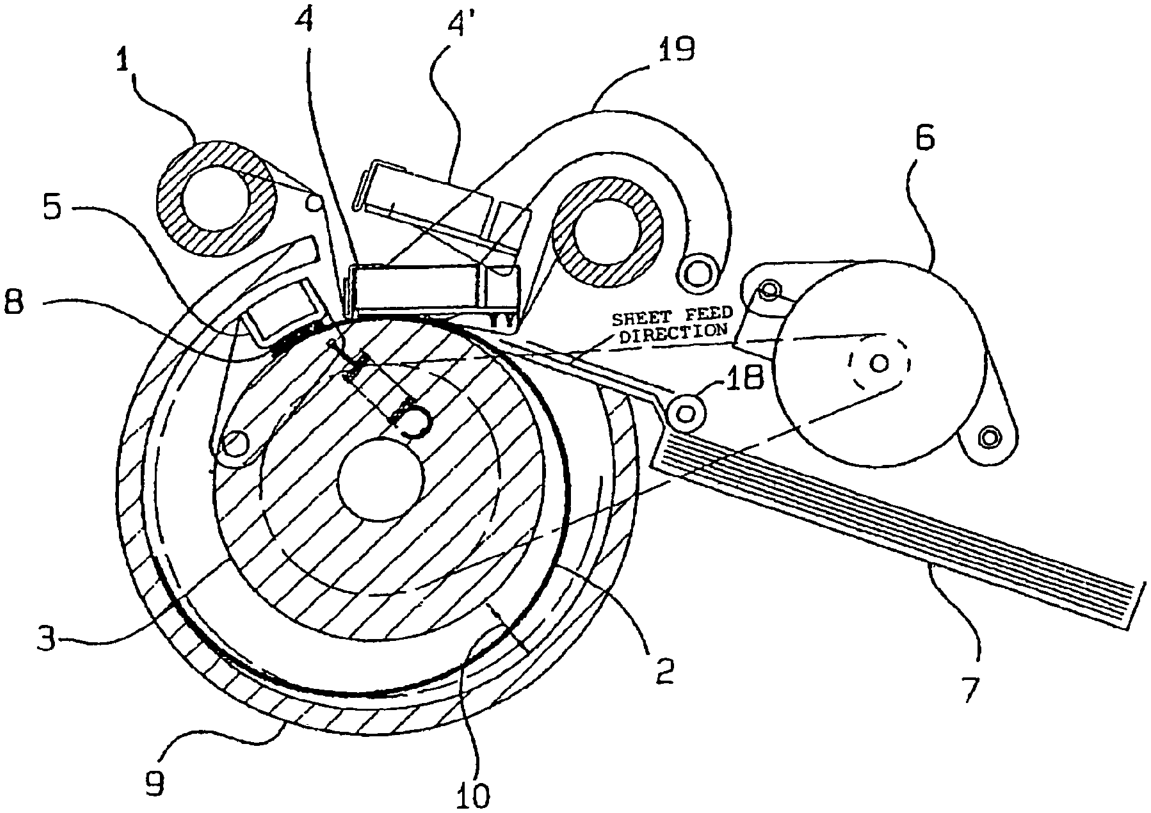
FIG. 1 is an exemplary diagram illustrating an example of a conventional image recording apparatus employing a thermal transfer method.
Figure 2:
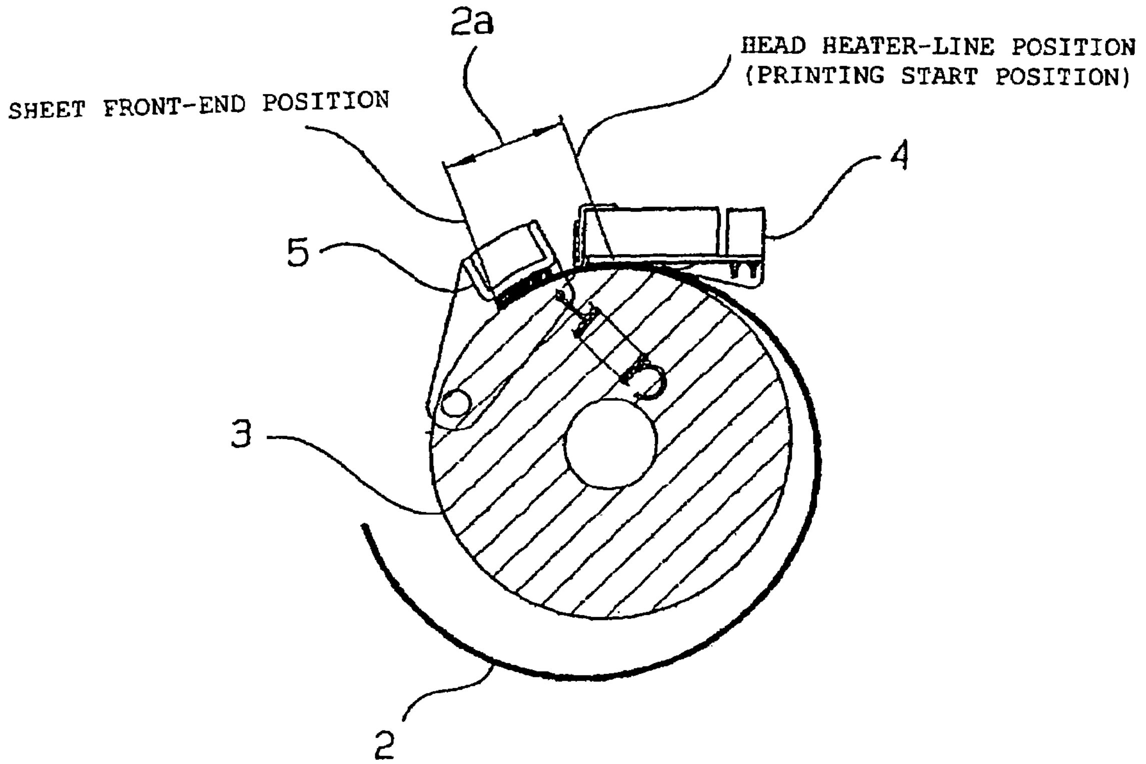
FIG. 2 is an exemplary diagram illustrating a conventional thermal transfer process.
Figure 3:
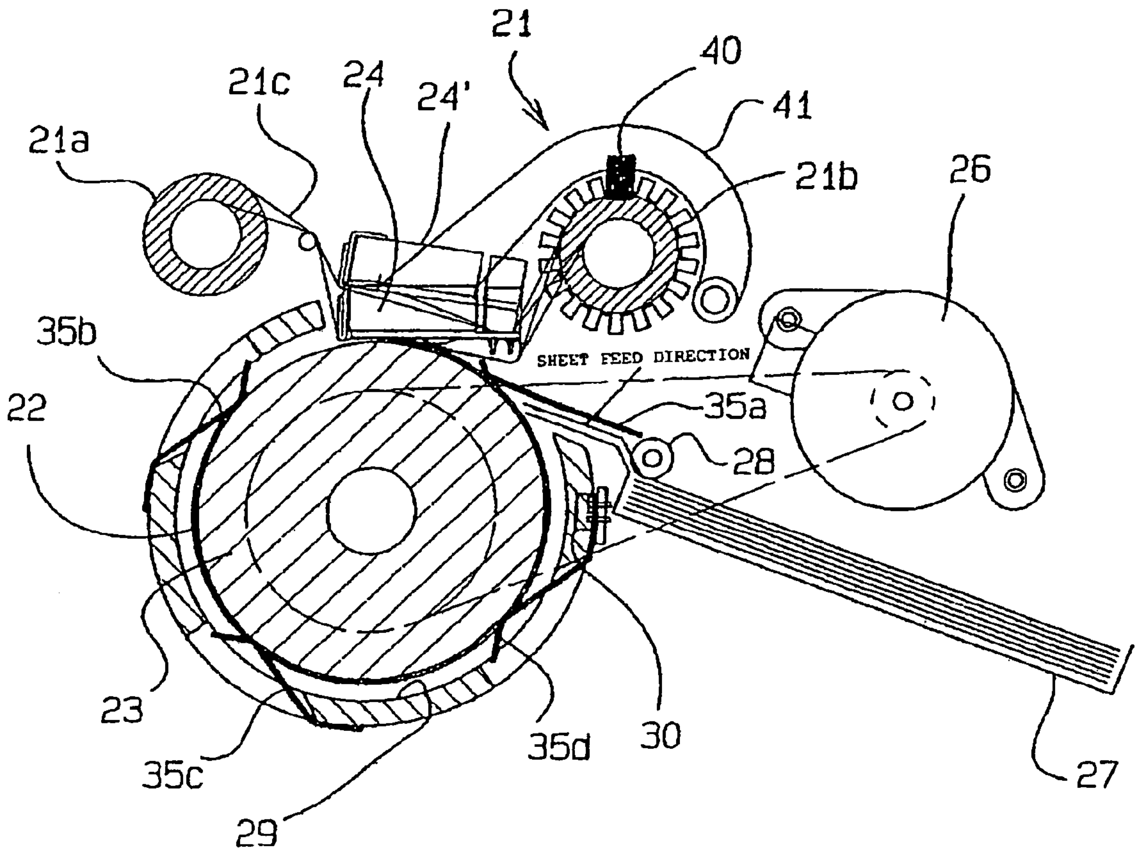
FIG. 3 is an exemplary diagram illustrating an embodiment of an image recording apparatus according to the present invention.

Now, embodiments of an image recording apparatus according to the present invention will be described with reference to the accompanying drawings. FIG. 3 shows a first embodiment of the present invention, and the image recording apparatus comprises, as primary components, a thermal transfer ribbon supply mechanism 21, sheets (recording media) 22, a platen drum (a frictional carrier drum) 23, a thermal head 24, a platen drum driving motor 26, a sheet hopper 27, a sheet feed roller 28, a cylindrical guide 29, a sheet position detecting unit 30, contact elements (auxiliary carrier members) 35*a*, 35*b*, 35*c*, and 35*d*, a ribbon supply detecting unit 40, a head lifting mechanism 41, etc. A control circuit of an image transfer process which controls functions of the constituent elements will be described later.

The thermal transfer ribbon supply mechanism 21 comprises a winding-up reel 21*a* for winding up a thermal transfer ribbon 21*c*, a receiving reel 21*b* for winding up and receiving the thermal transfer ribbon 21*c*, and a supply motor (not shown) of the thermal transfer ribbon 21*c* for driving the above reels.

The thermal transfer ribbon 21*c* drawn out from the receiving reel 21*b* is wound up around the winding-up reel 21*a* through a heating head portion on the lower surface of the thermal head 24. In the thermal transfer ribbon 21*c*, a plurality of color materials is applied on a base material, and the respective color materials are periodically separated by color. For example, three colors of yellow, magenta, and cyan constitute one group. According to circumstances, a ribbon to which black or a transparent overcoat material for coating a surface is added may be also prepared.

The ribbon supply detecting unit 40 generates a pulse whenever a predetermined amount of ribbon is supplied, and supplies the pulse to a control unit, which will be described later. The control unit estimates the force of drawing out the ribbon or the amount of ribbon used, based on a change in a pulse interval.

The thermal head 24 is constructed by arranging a plurality of minute heating elements in a line or plural lines, wherein each of the minute heating elements corresponds to one pixel. By supplying a pulse (PAM) current corresponding to an image (pixel) pattern to the respective heating elements from the control unit, which will be described later, the respective heating elements instantaneously generate high-temperature heat corresponding to the pulse level. By means of this heat, the color materials are melted and transferred to the sheet 22 from the base of the ribbon.

The head lifting mechanism 41 moves (moves forward and backward) the thermal head 24 in a diametrical direction of the platen drum 23, and keeps the thermal head 24 in contact with the platen drum 23 or separates the thermal head 24 from the platen drum 23. Usually, the head lifting mechanism 41 keeps the thermal head 24 in close contact with the platen drum in transferring the color materials to the sheet 22, and positions the thermal head at the separated position 24' in preliminarily feeding the sheet 22 or in supplying the ribbon 21*c*.

The platen drum 23 has a cylinder shape, and is covered with a frictional material. As the frictional material, synthetic rubber, such as silicon rubber, EPDM, chloroprene, or NBR, may be used. A static friction coefficient m between the frictional material and a predetermined sheet is about 0.8. Here, the static friction coefficient m means a friction coefficient when the relative slip speed of a measuring target is 1 mm/sec or less. The platen drum 23 is properly rotated by means of a motor 26. The platen drum 23 is surrounded with a cylindrical guide 29 for guiding a circumferential feed of the sheet 22, and a gap between the platen drum 23 and the guide 29 constitutes a path for carrying the sheet.

On the outer circumferential surface of the platen drum 23, the contact element 35*a*, the thermal head 24, the contact elements 35*b*, 35*c*, and 35*d*, and the sheet position detecting unit 30 are arranged in a counterclockwise direction. The contact elements are a plate-shaped member having a cross section of a chevron shape, and have a predetermined elasticity. The contact elements closely press the sheet 22 on the platen drum 23. The contact elements also function as guides for guiding the sheet 22 to rotatably move in a circumferential direction of the platen drum 23.

As described later, the static friction coefficient between each contact element and the sheet 22 is set to be 35% or less of the static friction coefficient between the aforementioned frictional material and the sheet, and preferably to be 30% or less thereof. As a result, stronger frictional force is secured between the frictional material and the sheet, thereby prevent the slip of the sheet. In this embodiment, the contact elements adjacent to each other form 90 in an angle about a rotating axis of the platen drum 23. This contributes to allowing the sheet 22 to come in close contact with the platen drum in the range of 90 (a quarter of the outer circumference of the platen drum). This is suitable for preventing the slip of the sheet 22. As described later, the mutual arrangement of the contact elements is not limited to this angel, but a winding angle when the sheet is held by several contact elements may be 90 or more.

The sheet position detecting unit 30 detects a position of the sheet, for example, the passing of the front end of the sheet, and supplies detection signals to the control unit 76, which will be described later. These signals are used for controlling the movement of the thermal head 24 or for determining heating start timing.

Next, an example of the sheet feed process of the aforementioned thermal transfer mechanism will be described with reference to FIG. 4.

Figure 4:
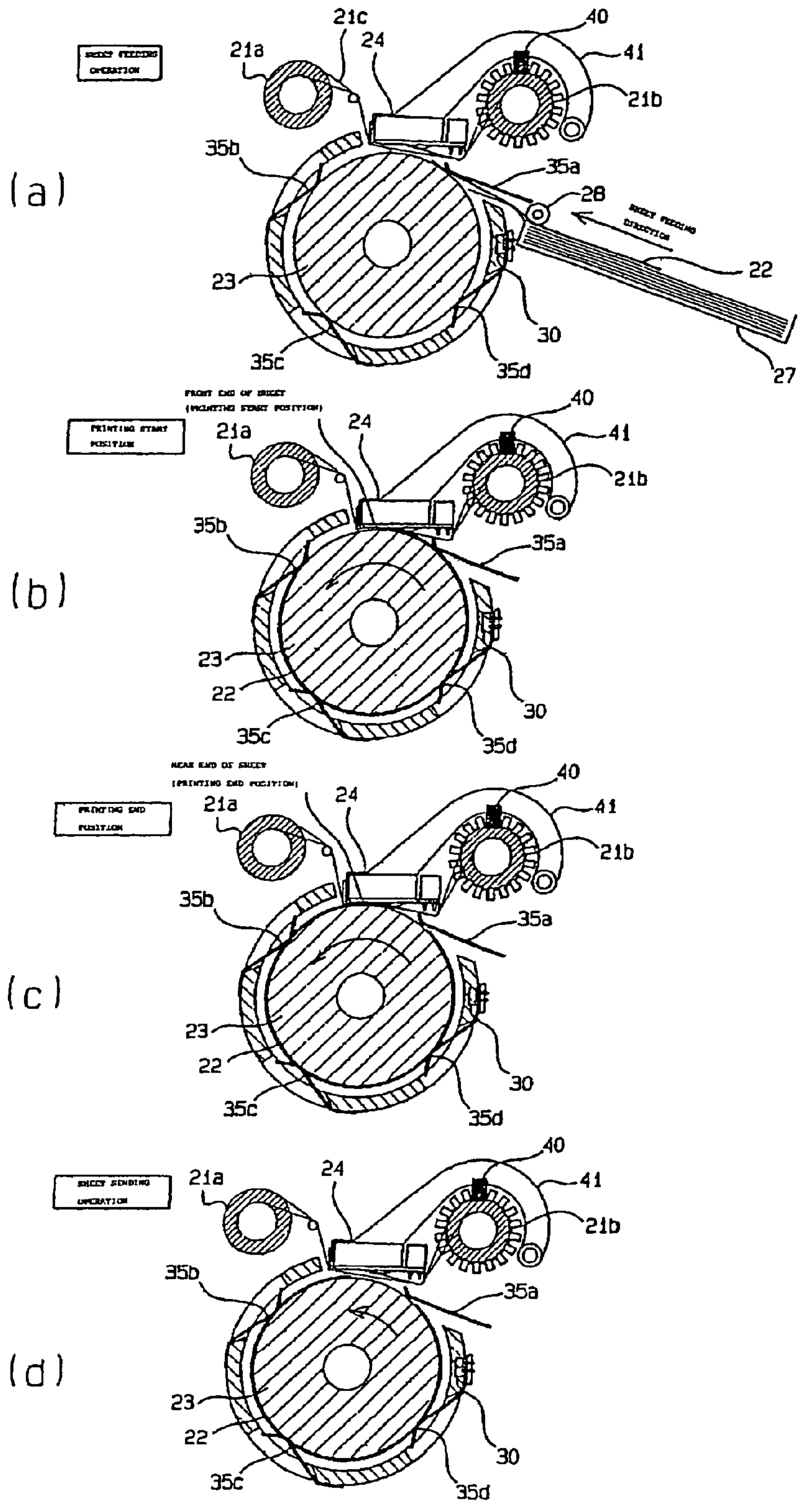
FIG. 4 is an exemplary diagram illustrating one transfer process according to an embodiment of the present invention.

First, as shown in FIG. 4(*a*), the thermal head 24 is set to the separated position, and an arbitrary color of the thermal transfer ribbon 21 is cued. Next, the sheet 22 is fed out from the sheet hopper 27 by means of the sheet feed roller 28. The sheet 22 is guided into the side surface of the contact element 35*a* and is then introduced into the front end of the contact element 35*a*. The contact element 35*a* is in contact with the platen drum 23 by a predetermined pressing force corresponding to a kind or size of the sheet, and the sheet 22 is sent to immediately before the thermal head 24 while being held between the contact element 35*a* and the platen drum 23. The contact element 35*a* is formed of a plate-shaped material having a small friction coefficient, but may have a construction in which the friction coefficient thereof is reduced by providing a roller at its front end as described above and by rotating the roller together with the platen drum 23.

Next, the drum driving motor 26 is driven. Through the holding of the sheet 22 by the rotated platen drum 23 and the contact element 35*a*, the sheet is carried in a counterclockwise direction. The front end of the sheet 22 passes below the thermal head 24 and reaches the contact element 35*b*, and the sheet is also held by the contact element 35*b* and the platen drum 23. In order to wind up the sheet 22 around the platen drum 23, the sheet 22 is carried up to immediately before a heater line (a heating element) of the thermal head 14 by guiding the sheet 22 by means of the contact elements 35*a*, 35*b*, 35*c*, and 35*d*. At that time, the sheet 22 is strongly wound up around the platen drum 23, and is held by the contact elements 35*a* to 35*d*.

As shown in FIG. 4(*b*), if the front end of the sheet 22 reaches a proper position below the heater line of the thermal head 24, in order to keep the thermal transfer ribbon 21 and the sheet 22 in close contact with each other, the head lifting mechanism 41 moves the thermal head 24 toward the platen drum 23 to applies pressure thereto. The thermal head 24 is supplied with power to generate heat corresponding to arbitrary dots (pixels), and the sheet 22 is carried while the heated color material is being transferred to the sheet 22 from the thermal transfer ribbon 21, thereby forming an image having the first color on the sheet 22 (see FIG. 4(*c*)).

After the first color image transfer is finished, as shown in FIG. 4(*d*), the head lifting mechanism 41 is driven to release the press of the thermal head 24, and separates the thermal head from the platen drum 23. The thermal transfer ribbon 21*c* is taken out to perform heading of a second color, and positioning (cuing) of the front end of the sheet 22 is performed by rotating the platen drum 23 in the counterclockwise direction (the image forming direction). A detecting unit 30, which will be described later, can be used to detect the front end thereof.

By repeating the aforementioned processes of FIGS. 4(*b*) to 4(*d*) necessary times and by transferring other color images on the sheet 22, a color image obtained by superposing a plurality of colors is formed. After forming the color image, by opening a guide (not shown) on a sheet discharge path provided around the platen drum 23, the printed sheet is fed out externally.

Figure 5:
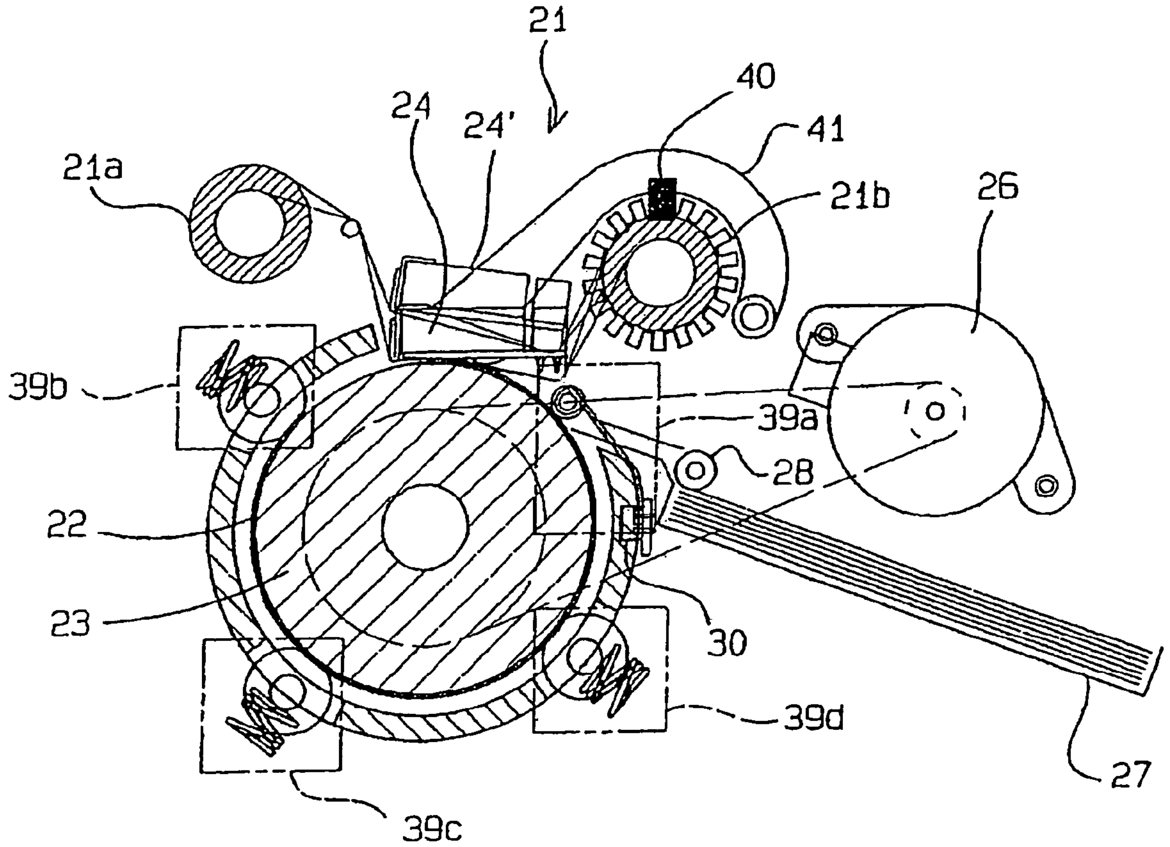
FIG. 5 is an exemplary diagram illustrating another embodiment of the present invention.

FIG. 5 shows another example of the aforementioned contact elements. In the figure, the elements corresponding to FIG. 3 are denoted by the same reference numerals, and a description thereof is omitted.

In this example, by forming the front end portions of the contact elements 39*a* to 39*d* out of rollers, a friction coefficient between the sheet and contact points of the rollers is smaller than the friction coefficient between the sheet and the static contact elements by a moment ratio between bearings of the rotating rollers and outer circumferential portions of the rotating rollers in contact with the sheet, so that the friction coefficient between the contact elements 36 and the sheet 22 can be easily reduced. Further, in order to apply biasing force for pressing the sheet 22 against the platen drum 23, the rollers are provided with elastic members, such as coil springs, plate springs, and rubbers. As a result, the static friction coefficient between the sheet 22 and the contact element 39 can be easily selected to be 30% or less of the friction coefficient between the sheet 22 and the platen drum 23.

Figure 6:
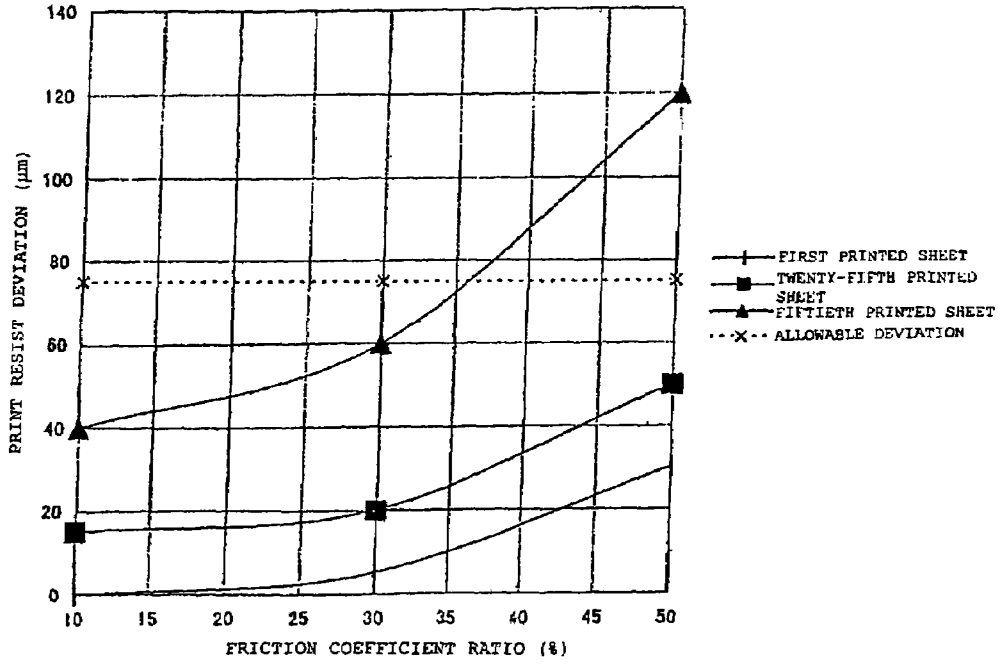
FIG. 6 is a graph illustrating the relationship between deviation in a printing position and various ratios of a friction coefficient between a recording medium and an auxiliary carrier member to a static friction coefficient between a frictional carrier drum and the recording medium by using the number of printed sheets as a parameter.

FIG. 6 is an exemplary diagram illustrating various experimental results for finding out conditions where the sheet to be carried while being wound up on the platen drum does not generate a slip.

A table and a graph shown in the figure show a variation in printing blur amount in accordance with various ratios (m2/m1) of the static friction coefficient m2 between the sheet 22 and the contact element 35 to the static friction coefficient m1 between the platen drum 23 and the sheet (a size of 127 mm by 89 mm). In the experimental example, when m1=0.8, m2 is changed variously. In the first printed sheet, the twenty-fifth printed sheet and the fiftieth printed sheet, a change in deviation is chased after. Since an ink ribbon clutch (not shown) for winding up and driving an ink ribbon is driven to make a torque constant, the tension of the ribbon tends to be changed with a change of the number of windings (the diameter of the wound ribbon) of the ribbon. As a result, it is considered that the tension of the ribbon is changed with a change of the number of printed sheets. The allowable deviation amount is set to 75 mm, which is the limit value of the deviation amount not providing an unpleasant sense when an image is a full color print is seen with naked eyes. Usually, in a case of a high-precision color printer, since the ability of human eyes to identify white and black is 50 mm, the deviation amount is set to be 75 mm in a case of a color image.

From this graph, it can be seen that the accuracy of the sheet feed is increased with a decrease in the ratio of static friction coefficients. If the ratio of static coefficient ratio is 35%, the slip of sheet is included within the allowable range of deviation even if the number of sheets continuously printed is fifty. Specifically, if the ratio of static coefficients is 35%, the slip of sheet is sufficiently included within the allowable range of deviation.

Therefore, in the aforementioned embodiment, a friction member having a proper friction coefficient, such as synthetic rubber, is formed on the outer circumference of the platen drum 23. By making sliding surfaces of the front ends of the contact elements smooth (35*a* to 35*d*), or by rotating the front ends, the friction coefficient thereof is set to be low (39*a* to 39*d*). The ratio of friction coefficients is set to be 35% or less, and more preferably 30% or less.

Figure 7:
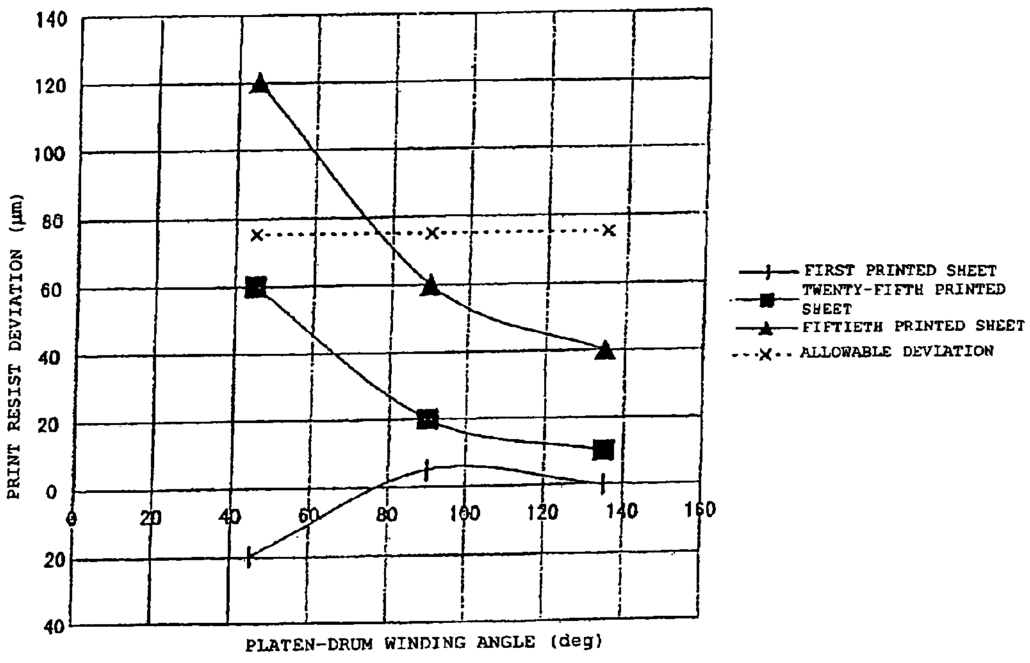
FIG. 7 is a graph illustrating the relationship between a winding angle of the recording medium around the frictional carrier drum and the deviation of a print resist by using the number of printed sheets as a parameter.

FIG. 7 shows an experimental example of an increase and decrease in the slip of a sheet of paper corresponding to an increase and decrease in the amount of the sheet wound up, in a case where the ratio of friction coefficients is set to be 30% on the basis of the above results.

Figure 8:
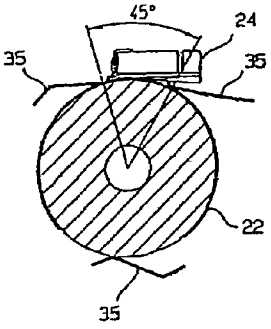
FIG. 8 is an exemplary diagram illustrating an experimental example of FIG. 7.
Figure 8:
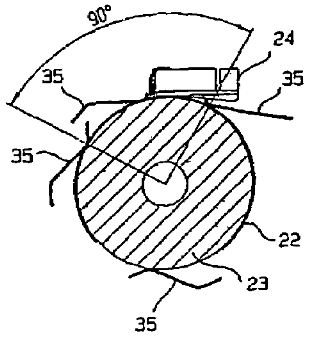
Figure 8:
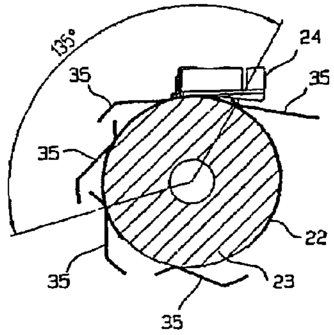
Figure 8:
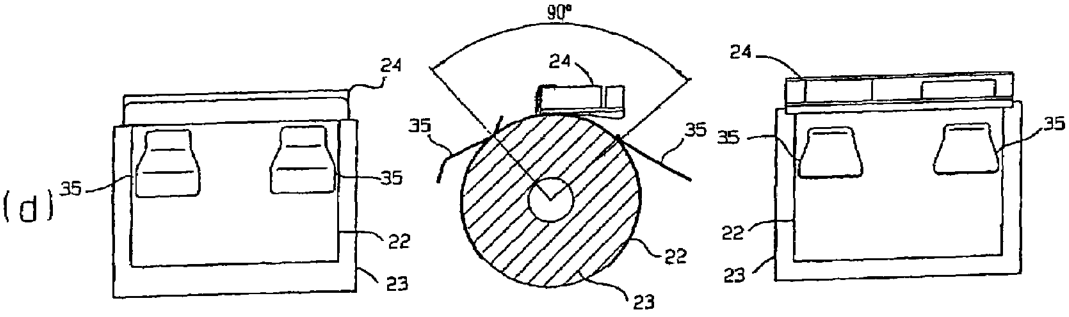

FIG. 8 shows a structural example of the sheet feed mechanism used to obtain various winding angles (the range in which the sheet is in close contact with the platen drum) of the sheet around the platen drum. In the figure, the elements corresponding to FIG. 3 are denoted by the same reference numerals.

According to the above experimental results, if the winding angel around the platen drum 23 exceeds about 90 (corresponds to a quarter of the outer circumference of the platen drum) as a circumferential angle around a rotating axis of the platen drum 23, it can be seen that the deviation of the printing position (the slip of the sheet) is remarkably reduced. That is, as shown in FIG. 8(*d*), the contact elements may be arranged, for example, at four positions shown in the figure such that the recording medium is wound up on a quarter or more of the platen drum. Furthermore, if the contact points are increased and the winding angle of the sheet wound up by means of the contact elements is increased, better results can be obtained.

Further, in a case of the first printed sheet, when the winding angle is 45 the sheet is deviated in a '– (minus)' direction. This is means that the sheet 22 is more rotated than the platen drum 23. This state is generated because the winding of the ribbon 21*c* by the thermal transfer ribbon supply mechanism 21 causes the sheet 22 to be drawn out. That is, the minute slip of the sheet is also influenced by the tension of the ribbon 21*c*. However, in this case, if the winding angle of the sheet 22 around the platen drum 23 is larger than 80 the influence of the tension of the ribbon on the slip of the sheet becomes smaller. A contact area (frictional force) between the sheet 22 and the platen drum 23 is increased, and the slip is difficult to generate, so that the influence of the ribbon is decreased. Since the sheet is rotated around the platen drum, the contact points with the contact elements are changed, and thus the winding angle around the platen drum is also changed. The winding angle in this case corresponds to the minimum winding angle in printing a sheet of paper.

In this way, with an increase in the winding angle of the sheet 22 around the platen drum 23, it can be seen that a more accurate (not causing a slip) sheet feed is possible.

Figure 9:
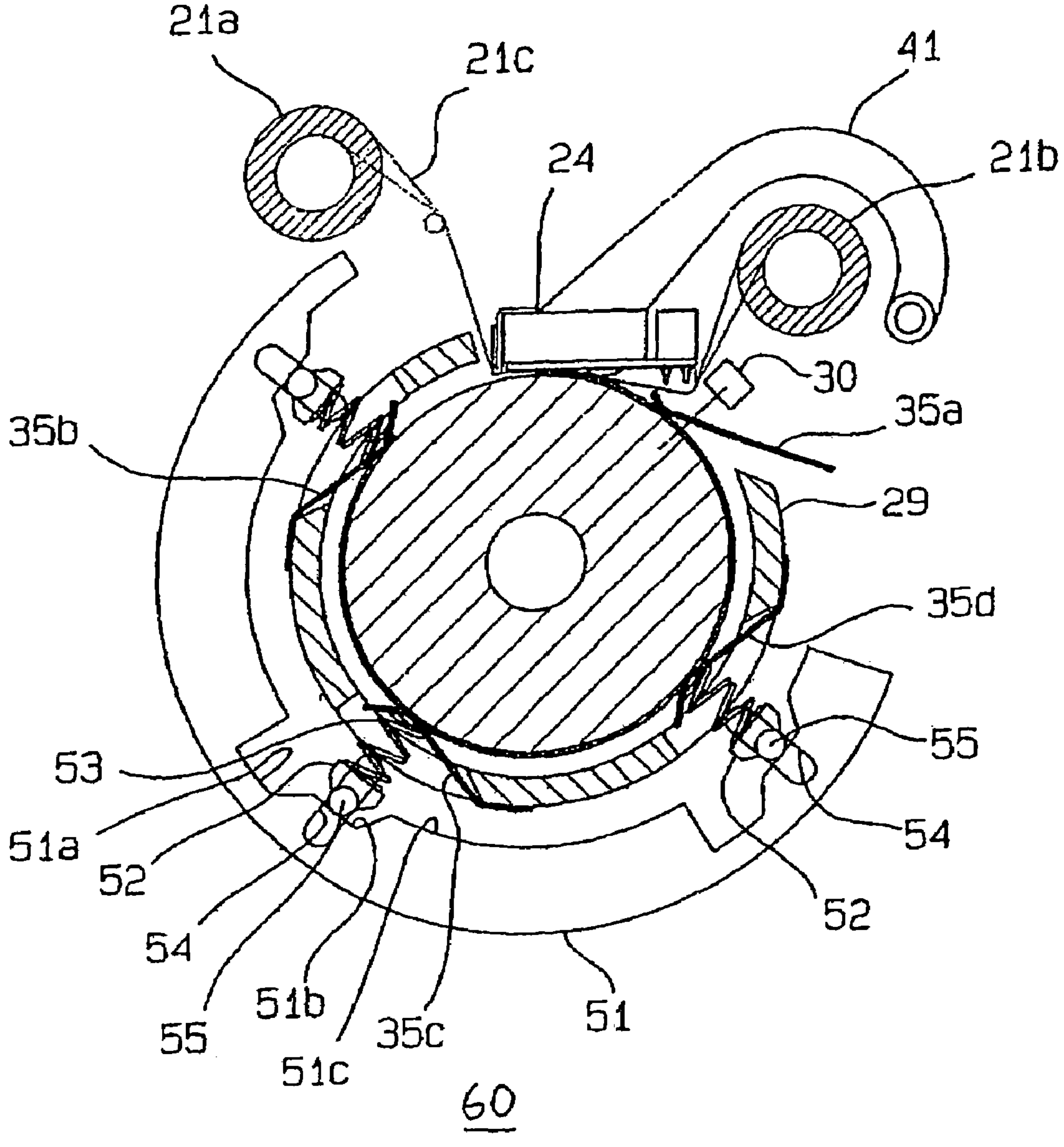
FIG. 9 is an exemplary diagram illustrating an embodiment in which the biasing force of a plurality of auxiliary carrier members is allowed to vary using a ring-shaped link.

FIG. 9 shows an example in which the pressing force of the contact elements is set to be variable. In the figure, the same elements as those in FIG. 3 are denoted by the same reference numerals, and a description thereof will be omitted.

It is convenient that various recording sheets can be used for an image recording apparatus. In order to stabilize the sheet feed, it is preferable that holding force for holding a sheet of paper be set corresponding to, for example, a normal paper, a thermal sublimation recording paper, a seal paper, a postcard, etc. Therefore, in the construction shown in FIG. 9, the pressing forces of the contact elements can be set to be variable, for example, as 'small', 'middle', and 'large'.

In the figure, a ring-shaped link member 51 is provided to surround the outside of the cylindrical guide 29. The ring-shaped link member 51 can be rotated in a forward direction and a reverse direction, although not shown. Step-shaped cam surfaces 51*a*, 51*b*, and 51*c* are formed at positions corresponding to the contact elements on the inner circumference of the ring-shaped link member 51. Cam followers 55 are in contact with the cam surfaces. The cam followers 55 are guided by longitudinal grooves 54 formed in a radial direction in a plate (not shown), and if the ring-shaped link member 51 is rotated, the cam followers are also moved in a diametrical direction of the ring-shaped link member 51 (the diametrical direction of the platen drum 23). Elastic members 53, such as coil springs, synthetic rubbers, and plate springs, are disposed between the cam followers 55 and sliding elements 35.

Figure 10:
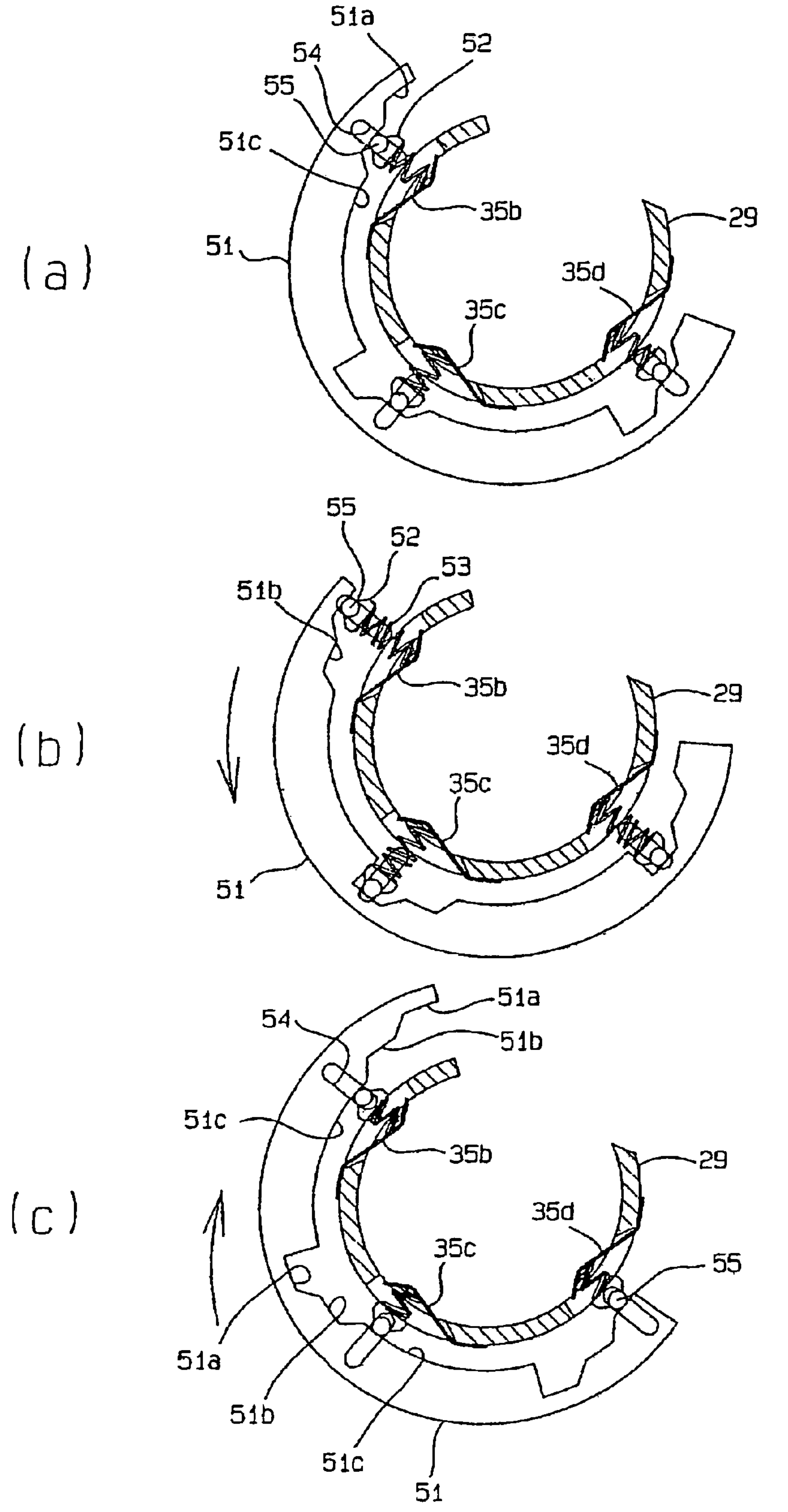
FIG. 10 is an exemplary diagram illustrating an example in which the biasing force of the auxiliary carrier members is set through the rotation of the ring-shaped link.

FIG. 10 is a diagram illustrating an operational example of the constituent elements when the ring-shaped link member 51 is rotated.

In FIG. 10(*a*), the pressing force is 'middle', and thus the cam followers 55 are located on the cam surfaces 51*b* of a middle step. As a result, the pressure that the elastic members 53 apply to the contact elements is set to be middle. FIG. 10(*b*) shows an operational example of the constituent elements when the ring-shaped link member 51 is rotated in the counterclockwise direction from the state shown in FIG. 10(*a*), where the pressing force is 'small', the cam followers 55 are located on the cam surfaces 51*a* of a low step, and thus the elastic member 53 is expanded to decrease the biasing force of the elastic member 53. As a result, the pressure against the contact elements 35 is lowered. FIG. 10(*c*) shows an operational example of the constituent elements when the ring-shaped link 51 is rotated in the clockwise direction from the state shown in FIG. 10(*a*), and the pressing force is 'large'.

The cam followers 55 are located on the camp surfaces 51*c* of a high step, and the elastic members 53 are compressed to raise the biasing force of the elastic members 53. As a result, the pressure against the contact elements 35 is increased.

The ring-shaped link member 51 can be rotated manually, and can set the pressing forces of the contact elements in accordance with the kind of the sheet. Further, by forming a worm gear in the ring-shaped link member 51 and by rotatably driving the worm gear with a motor (not shown), the ring-shaped link member 51 can be rotated in the forward direction and the reverse direction.

Figure 11:
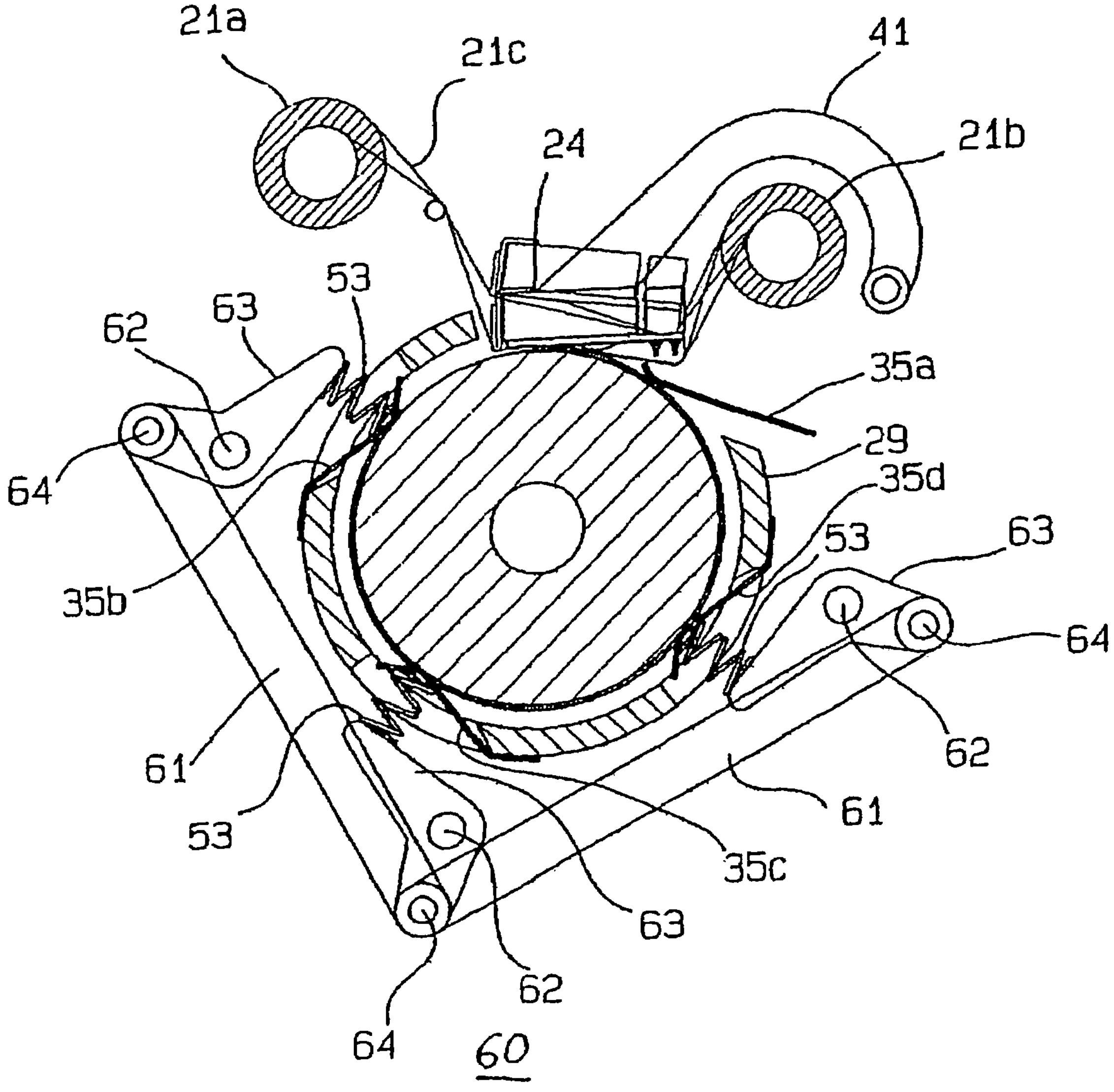
FIG. 11 is an exemplary diagram illustrating another embodiment in which the biasing force of a plurality of auxiliary carrier members is allowed to vary using a line-shaped link.

FIG. 11 shows another embodiment in which the pressing force of the contact elements is set to be variable. In the figure, the same constituent elements as those in FIG. 3 are denoted by the same reference numerals, and a description thereof will be omitted.

In this example, a straight-line (rod) shaped link member 61 rotatably coupled is used. The link member 61 may be bent. Levers 63 having a '<' shape and rotatably supported about supporting points 62 are arranged on the outsides of the contact elements 35*b* to 35*d*. The elastic member 53 is disposed between one end of the lever 63 and a contact element.

One end of the link member 61 is rotatably coupled to the other end of the lever 63 through a connection pin 64. The other end of the link member 61 is coupled to the other end of another lever 63 through a connection pin 64. Since the respective levers 63 are connected to each other by means of the link member 61, the overall levers 63 work together, and can set the pressing forces of the contact elements 35 to the same pressure using the elastic members 53. By individually setting the shape of the link member 61 or the shape of the levers 63, the pressures of the respective contact elements may be set independently.

Figure 12:
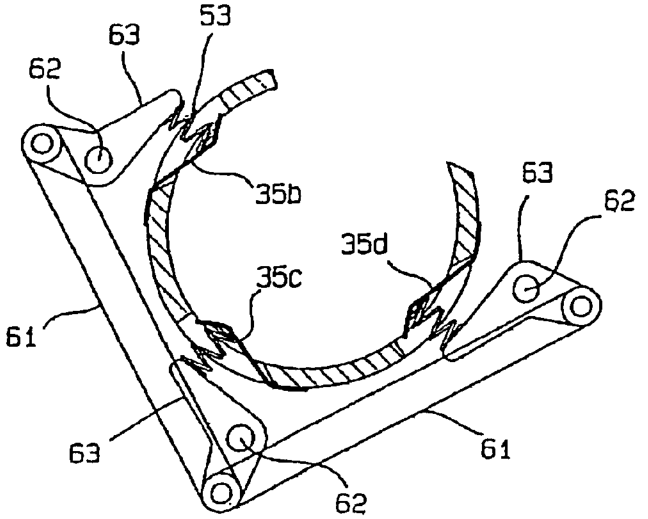
FIG. 12 is an exemplary diagram illustrating an example in which the biasing force of the auxiliary carrier members is set through movement of the line-shaped link.
Figure 12:
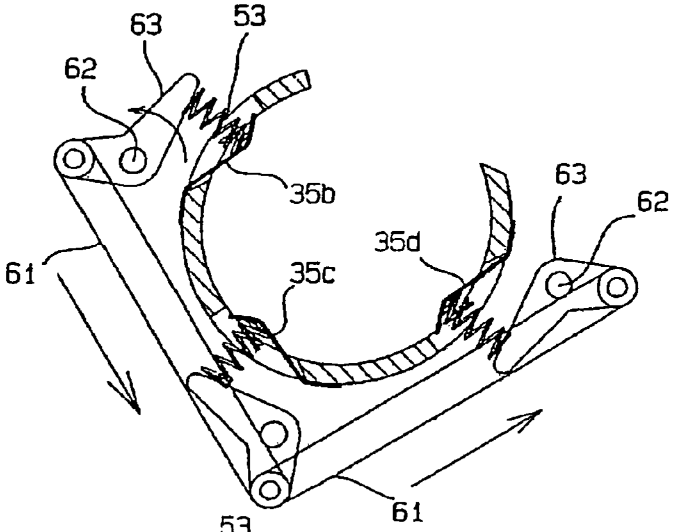
Figure 12:
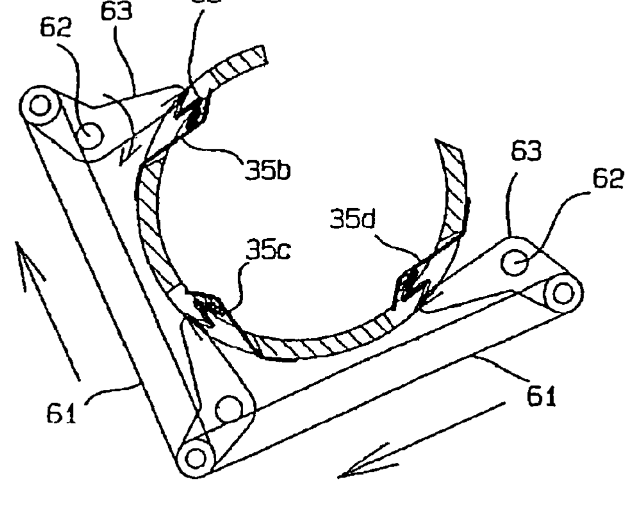

FIG. 12 is an exemplary diagram illustrating an operational example of a pressure adjusting mechanism for the contact elements shown in FIG. 11.

In FIG. 12(*a*), the pressing force is 'middle', and the levers 63 are located at a middle position. Accordingly, the pressure applied to the contact elements by the elastic members 53 is set to 'middle'. FIG. 12(*b*) shows an operational example of the mechanism when the link member 61 is moved in the counterclockwise direction from the state shown in FIG. 12(*a*), where the pressing force is 'small'. The levers 63 are rotated counterclockwise and thus are opened outwardly, and the elastic members 53 are expanded to reduce the biasing force of the elastic members 53. As a result, the pressure against the contact elements 35 is decreased. FIG. 12(*c*) shows an operational example of the mechanism when the link member 61 is moved in the clockwise direction from the state shown in FIG. 12(*a*), where the pressing force is 'large'. The levers 63 are rotated clockwise to compress the elastic members 53, thereby increasing the biasing force of the elastic members 53.

As a result, the pressure against the contact elements 35 is increased.

In the above example, the slip of the sheet is mechanically suppressed. However, in an embodiment shown in FIGS. 13 to 17, the minute slip of the sheet is predicted to more accurately determine an image transfer start position and to prevent the images of respective colors from deviating in color images.

Figure 13:
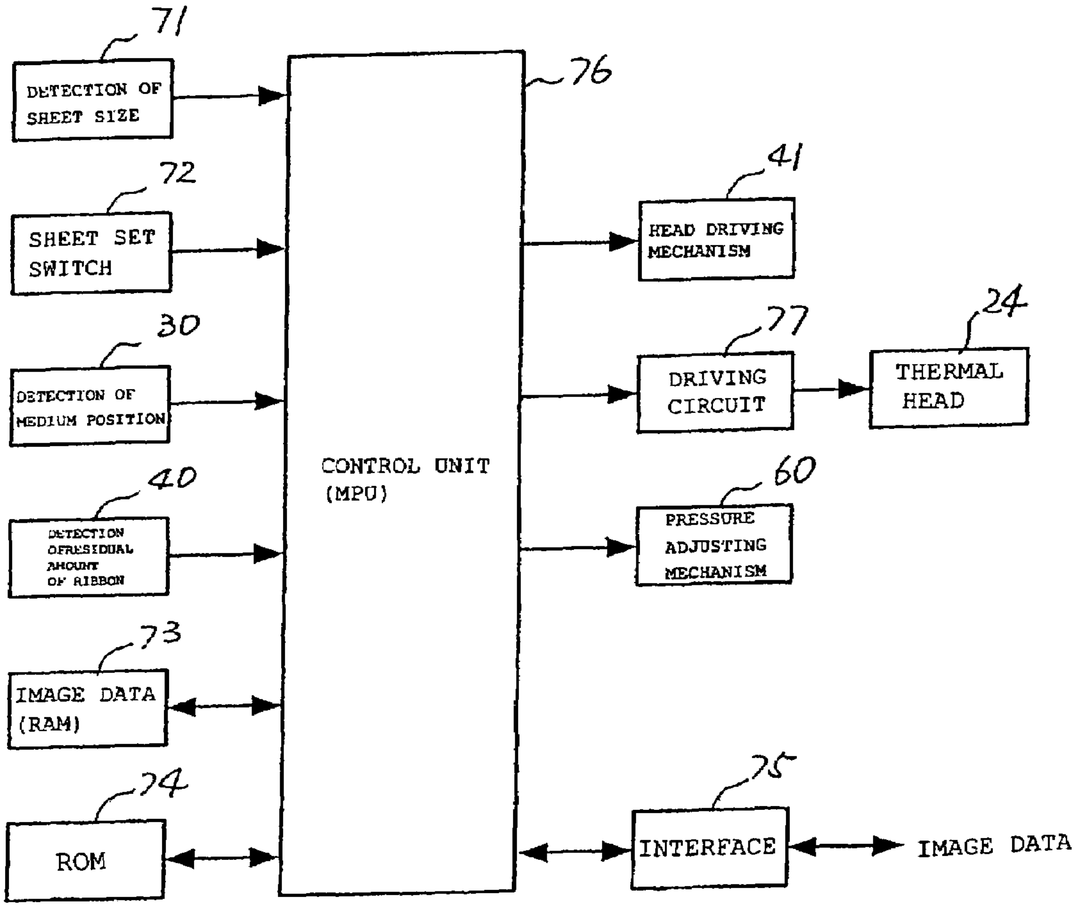
FIG. 13 is a block diagram illustrating a control system of the image recording apparatus.

FIG. 13 is a block diagram illustrating the operation of a control system for preventing a positional deviation between the transfer start position and the front-end position of the sheet through the operational control using the prediction of the slip. A sheet size detecting unit 71 for detecting the size of sheets by detecting a position of a sheet set guide is provided in the sheet feed tray 27, and supplies the detected sheet size to the control unit 76 to establish a flag corresponding to the sheet size in an inner memory. A sheet setting switch 72 for setting the kind of a sheet is provided in the vicinity of the sheet feed tray. For example, if a user sets the kind of a sheet, such as a normal paper, a sublimation transfer paper, and a label paper, by using a selection switch, the output is supplied to the control unit 76, and a flag representing the kind of the sheet is established in the inner memory. A detection output of a recording medium detecting unit 30 for detecting the passage of the recording medium, such as sheets, is supplied to the control unit 76, and a passage detection flag is established in the inner memory. A residual ribbon amount detecting unit 40 detects the generation of periodical pulses in response to the supply of the ribbon, and supplies the detection results to the control unit 76. The control unit 76 estimates the outer diameter of the ribbon from a change of the pulse interval, and as described later, estimates a minute positional deviation in the superposition of printed colors resulting from a change in the tension of the ribbon due to the change in the outer diameter of the ribbon. An image data memory 73 comprising a RAM stores image data supplied to the control unit 76 from an external apparatus, such as a digital camera, through an interface 75. The image data is properly read out by the control unit 76. ROM 74 stores control programs (not shown) or a database containing various data relating to a slip. The head lifting mechanism 41 moves upward and downward the thermal head 24 in accordance with instructions from the control unit 76. A driving circuit 77 amplifies the image data signals supplied from the control unit 76, and drives heating elements of the thermal head 24. The pressure adjusting mechanism 60 sets the pressing forces of the contact elements in accordance with instructions from the control unit 76. Accordingly, the pressing forces can be automatically set corresponding to a kind or size of the sheet. The interface 75 receives image data from the external apparatus, such as a digital camera, and stores the image data in the image data memory 73, for example, through the DMA operation.

The control unit 76 is composed of one chip LSI into which a CPU, a memory, an interface, a timer, etc., are fitted and performs at least a control for preventing the slip of a sheet, which will be described later.

Figure 14:
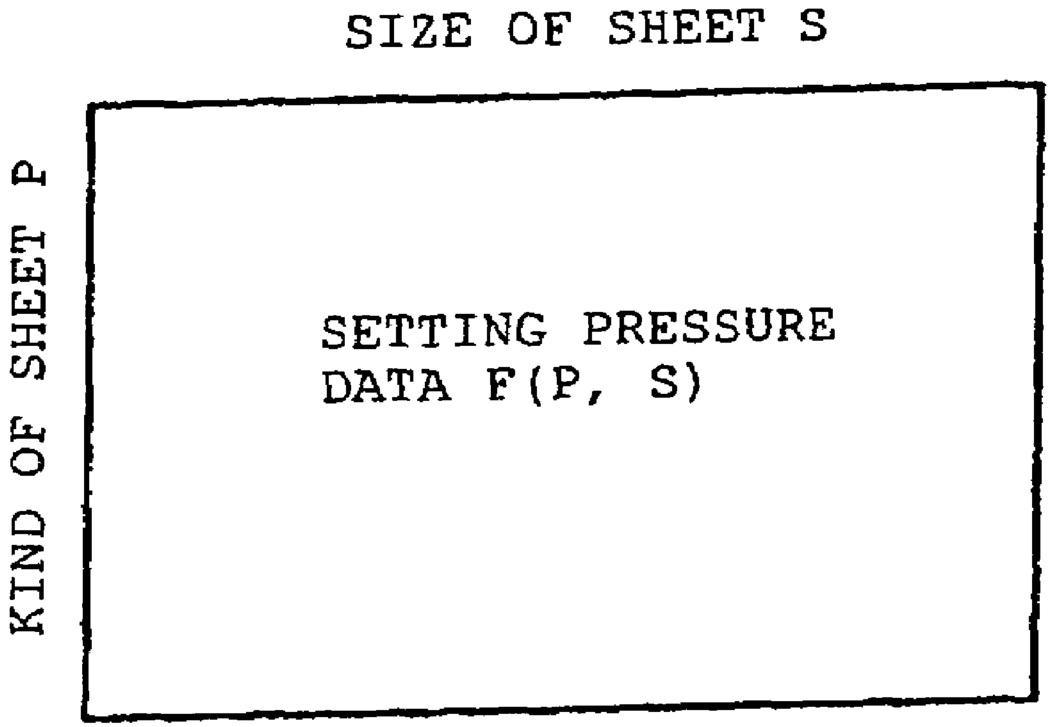
FIG. 14 is an exemplary diagram illustrating an example of a pressure setting table stored in a database.
Figure 15:
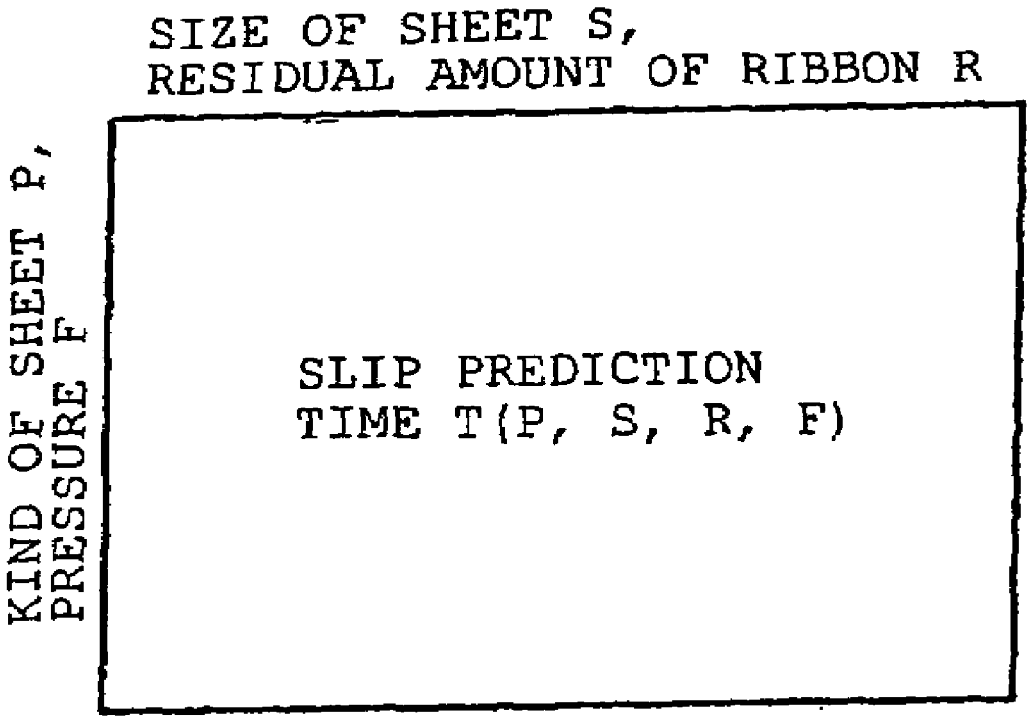
FIG. 15 is an exemplary diagram illustrating an example of a slip predicting table stored in the database.

FIGS. 14 and 15 show examples of data conversion tables previously stored in the ROM 74.

As shown in FIG. 14, table data for setting the optimum pressures of the contact elements in accordance with the kind and size of a sheet are stored. The position of the link member 51 and the pressing forces F(Pn, Sm) suitable for the respective contact elements are set based on flag data of the kind Pn of a sheet and the size Sm of a sheet, thereby preventing a slip in feeding a sheet.

FIG. 15 shows an example of a table, which is previously stored in a database, containing factors causing the slip of a sheet and the degree of the slip due to the factors. The factors of slip include, for example, the kind P of a sheet, pressing force F by a contact element, the size S of a sheet, and the tension of a ribbon R. Values T of the slip of the corresponding sheet due to a combination of the factors are stored in the table. The combination may include a case in which a specific slip factor is 0, or a case in which all the slip factors are 0 (a case in which the table is not used), and the control operation may be restricted to a factor having a large influence. For example, in a case of a sheet feed structure in which the ribbon tension does not have an influence on the slip of sheets, the ribbon tension R is excluded from the parameters (the parameter value is '0').

Figure 16:
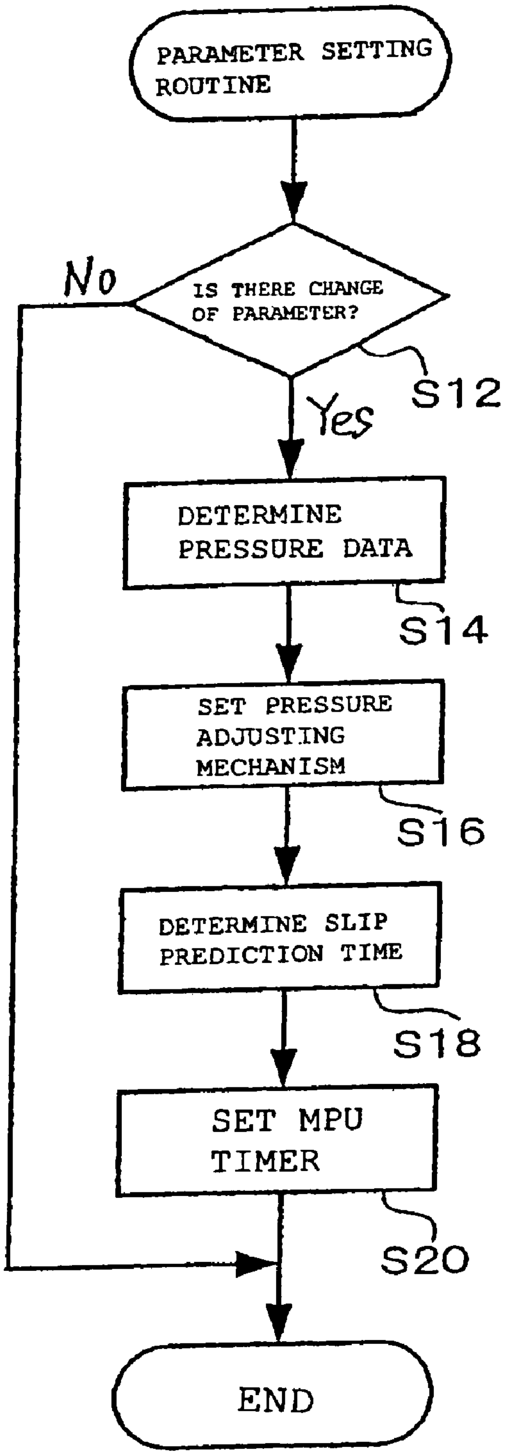
FIG. 16 is a flowchart illustrating a process in which a control unit sets parameters.

FIG. 16 is a flowchart illustrating an example of a parameter setting routine for performing various settings corresponding to the input parameters, such as the kind and size of the sheet, in various programs to be executed by the CPU of the control unit 76.

Immediately after starting, and regularly thereafter, the CPU checks a flag register of the memory. If the setting of the flag is not changed, this routine is finished (S12; No).

For example, if a flag representing the kind and size of the sheet is changed (S12; Yes), an input to be set for the contact elements is determined with reference to the data table (FIG. 14) (S14). A state in which the pressure adjusting mechanism 60 applies the corresponding biasing force to the contact element is set based on the above determination (S16). Next, on the basis of various states of flags or parameter values of the slip factors, slip prediction time is determined with reference to the slip prediction table (FIG. 15) (S18). Sheet movement time from the detecting unit 30 to a reference transfer start position is corrected based on the slip prediction time, and the corrected value is set in a built-in timer of the control unit (S20).

Thereafter, the procedure returns to the original processing routine.

Figure 17:
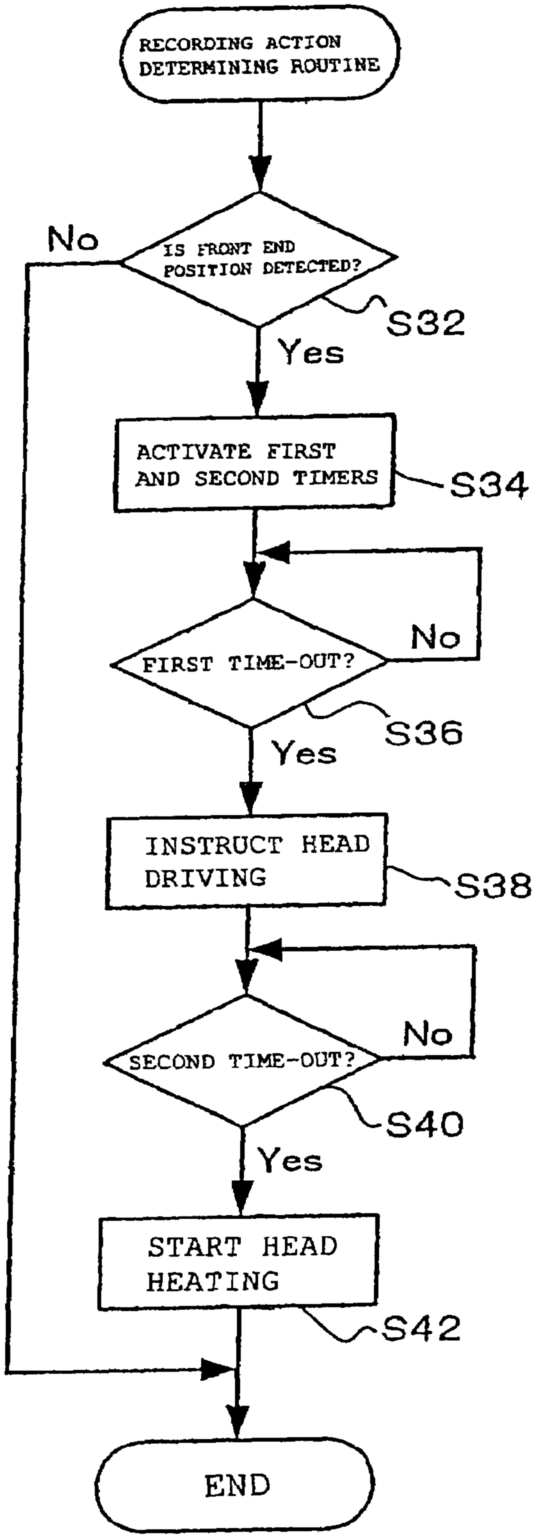
FIG. 17 is a flowchart illustrating a process in which the control unit sets the heating start timing of the thermal head.

FIG. 17 is a flowchart illustrating an example of a routine for determining the transfer start timing on the sheet in the transfer process.

First, the CPU determines whether the detection is notified from the detecting unit 30 for detecting the passage of the front end of a sheet in accordance with the setting of a flag (S32). When the flag is not set (S32; No), this routine is finished. When the flag is set (S32; Yes), time-checking operations of the first and second timers built in the control unit start. The timers can be composed of counters for continuously counting a system clock. A time interval from a point of time when the sheet passes through the detecting unit 30 to a point of time when the thermal head is brought into contact with the platen drum (or the sheet) is set in the first timer. A time interval from the passage of the sheet to the heating start of the thermal head is set in the second timer. As described above, the heating start time is corrected by time corresponding to the estimated slip amount of a sheet (S34). If the time interval set in the first timer passes (S36; Yes), the CPU gives an instruction for the head lifting mechanism 41 to operate, so that the thermal head is moved at a position coming into contact with the platen drum, and preferably the lower surface of the thermal head goes down to the front end portion of the sheet. If the time interval set in the second timer passes (S40; Yes), the CPU starts the supply of image data signals to the driving circuit 77. The image data are continuously supplied as image data for every scanning line in synchronism with the feed of the sheet. As a result, an image with a specific color is transferred on the sheet from the ribbon (S42). Thereafter, this process is finished, and the procedure returns to the original process routine.

Since the processes of steps S32 to S42 are performed on the transfer processes of the respective colors, it is possible to prevent the color blur of an image in forming a full color image as much as possible.

In this way, by controlling the thermal head 24 on the basis of the output of the detecting unit 30 provided in the vicinity of the thermal head 24, slip does not have an influence on blurs of a transferred image, except for the slip of sheets in a slight distance interval from the detecting unit 30 to a mechanical transfer position under the thermal head 24. A slight slip (a minute slip of a sheet that cannot be completely corrected by a mechanical method) in this short interval is corrected by finely adjusting the transfer start time of the thermal head on the basis of the estimated slip value. As a result, it is possible to prevent a blur of a color image.

Figure 18:
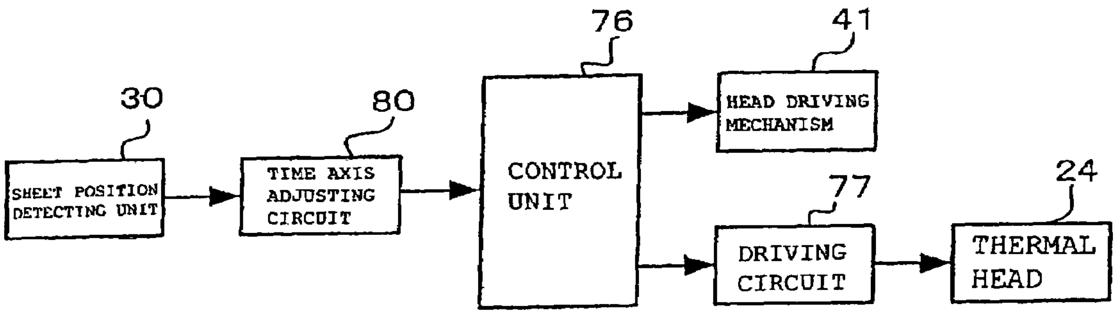
FIG. 18 is a flowchart illustrating a process (a basic process) in which the control unit sets the heating start timing of the thermal head.

FIG. 18 shows an example in which the construction of circuits for correcting the slip of a sheet through the aforementioned electrical adjustment is more simplified. In the figure, the same constituent elements as those in FIG. 13 are denoted by the same reference numerals. In this embodiment, when the detecting unit 30 detects the passage of the front end of the sheet 22, the control unit 76 allows the head lifting mechanism 41 to operate after a predetermined time from the detection time, thereby lowering the thermal head 24. The control unit supplies power to the thermal head 24 to start heating. As a result, the sheet feed range in which the slip of a sheet causes a problem is narrowed. In combination with the mechanical structure for reducing the slip of a sheet described above, the slip of a sheet can be sufficiently prevented. A time axis adjusting circuit 80, for example, a variable signal delay circuit is provided between the sheet position detecting unit 30 and the control unit 76, and when the ribbon tension, etc., causes a problem, the supply timing of the detection signals to the control unit can be finely adjusted.

As a result, the deviation between the transferred images can be corrected.

In this way, according to the aforementioned embodiments of the present invention, since a sheet carrying mechanism is constructed so as not to easily generate the slip of a sheet without providing the clamp mechanism, it is possible to form a transfer image on the entire surface of a sheet without generating a large blank space in the outer edge of the sheet (an image recording medium).

Since a sheet position is detected at a position close to the thermal head and the power supply start timing to the thermal head is set from the position, it is possible to restrict a range in which the slip of a sheet causes the deviation between transfer positions.

Furthermore, since the slip is estimated within the above range and the power supply start timing can be further adjusted, it is possible to solve a disadvantage due to the slip of a sheet during the carriage of the sheet.

Furthermore, by the platen drum, one-way printing of carrying a sheet only in one direction can be implemented, and thus it is not necessary to reciprocate the sheet. Therefore, it is possible to realize a high-speed full color print.

Furthermore, since components accompanied with the clamp mechanism are not required and a space for reciprocating a sheet as in a grip roller method is also not required, it is possible to implement an image recording apparatus with a small size and low cost. In addition, since waste pieces of sheets are not generated, it is possible to realize a high-speed printer with excellent quality.

Furthermore, as shown in FIG. 9, it is possible to dispose the detecting unit 30 for detecting a front-end position (or a predetermined position) of a sheet at a position closer to the thermal head 24.

Furthermore, in a case in which a change of ribbon tension affects the slip of a sheet, by estimating the outer diameter of the ribbon from a change of a periodical pulse of the ribbon through the detecting unit 40, by previously storing minute deviation between superposed positions of the printed colors due to a change in tension of the ribbon resulting from the change of the outer diameter of the ribbon with an increase of the number of printed sheets in a table (FIG. 15), and by estimating the diameter of the ribbon detected during printing by means of the ribbon encoder detecting unit 40, a minute positional deviation between the sheet wound up around the platen drum and the platen drum can be predicted. Then, by controlling the heating start position of the thermal head in accordance with the positional deviation, it is possible to output color images having excellent quality without the blur of colors.

In the above embodiments, a case in which sheets are carried mainly has been exemplified, but various recording media, such as seal papers, sublimation-type thermal transfer papers, transparent films, thermal recording papers, and thermal color recording papers, may be used.

INDUSTRIAL APPLICABILITY

As described above, in the image recording apparatus according to the present invention, it is possible to accurately feed recording media (sheets) wound up around the frictional carrier drum without using a holding member, such as a clamper. Because the holding member, such as a clamper, is not provided, the thermal head can be pressed against any position of a sheet, and the thermal head and the ink ribbon can be allowed to come in contact with each other at any position from the front end to the rear end of the sheet. Therefore, it is possible to perform a printing on the entire surface of the sheet. Thus, since a sheet of which the entire surface is printed without a blank space can be obtained, it is not necessary to cut out the sheet with a roulette or with an expensive automatic cutter, so that waste pieces of sheets are not generated, and a complete print without a blank edge can be obtained.

The invention claimed is:

1. A thermal transfer type image recording apparatus for forming an image on a sheet-shaped recording medium using a thermal head, the image recording apparatus comprising:

a frictional carrier drum that is rotated in synchronous relation with a thermal transfer process, the entire surface of at least a portion thereof with which the recording medium comes in contact being covered with an elastic member, such as rubber;

a recording medium guiding mechanism for guiding the recording medium toward the frictional carrier drum; and one or more auxiliary carrier members for feeding the recording medium with rotation of the frictional carrier drum in such a way at least a part of the recording medium comes into close contact with the frictional carrier drum, wherein a friction coefficient between the frictional carrier drum and the recording medium and a friction coefficient between the recording medium and the auxiliary carrier members is set such that a ratio of the friction coefficient between the recording medium and the auxiliary carrier members to the coefficient between the frictional carrier drum and the recording medium is set to be 35% or less, wherein the contact length between the recording medium and the frictional carrier drum is a quarter or more of an outer circumference of the frictional carrier drum, and wherein an allowable deviation amount of a slip generated between the recording medium and the frictional carrier drum is kept within 75 μm.

2. The image recording apparatus according to claim 1, further comprising a ribbon passing through between the thermal head and the frictional carrier drum, wherein the thermal head heats the ribbon and transfers a color material from the ribbon to the recording medium.

3. The image recording apparatus according to claim 1, wherein the auxiliary carrier members are formed at four or more positions on the frictional carrier drum.

4. The image recording apparatus according to claims 1, wherein the recording medium includes a thermal transfer dedicated paper, a normal paper, a label paper, a transparent film, a thermal recording paper, and a thermal color recording paper.

5. The image recording apparatus according to claim 1, wherein the auxiliary carrier members include plate-shaped or spiral-shaped elastic members.

6. The image recording apparatus according to claim 1, wherein the auxiliary carrier member further comprise a function for guiding the movement of the recording medium in the rotating direction of the frictional carrier drum.

7. The image recording apparatus according to claim 1, wherein the auxiliary carrier member selects any pressure to keep close contact of the recording medium against the frictional carrier drum, depending on different recording mediums.

8. The image recording apparatus according to claim 1, wherein the auxiliary carrier member is designed to select any pressure to keep close contact of the recording medium against the frictional carrier drum, depending on different recording mediums, and wherein a link mechanism is further provided for determining any pressure common to a plurality of auxiliary carrier members to keep the recording medium in close contact with the frictional carrier drum, the link mechanism comprising:

a ring-shaped member whose the inner circumference is provided with a plurality of cam surfaces and which can rotate in a circumferential direction;

a plurality of elastic members for generating biasing force for pressing the plurality of auxiliary carrier members toward the frictional carrier drum, respectively; and a plurality of cam followers which is moved in a diametrical direction of the ring-shaped member along the plurality of cam surfaces, respectively, and which sets the biasing force to a plurality of steps by expanding and compressing the respective elastic members, or the link mechanism comprises:

elastic members for generating biasing force for pressing the plurality of auxiliary carrier members arranged around the frictional carrier drum against the frictional carrier drum, respectively;

a plurality of levers which is rotatably arranged in the vicinity of the plurality of auxiliary carrier members and which expands and compresses the elastic members; and one or more connecting members for mutually connecting the levers.

9. A thermal transfer type image recording apparatus for forming an image on a sheet-shaped recording medium using a thermal head, the image recording apparatus comprising:

a frictional carrier drum that is rotated corresponding to a thermal transfer process;

a recording medium guiding mechanism for guiding the recording medium to be fed toward the frictional carrier drum;

one or more auxiliary carrier members for feeding the recording medium with rotation of the frictional carrier drum in such a way at least a part of the recording medium comes into close contact with the frictional carrier drum, bringing at least a part of the recording medium into contact with the frictional carrier drum and for rotating the recording medium together with the frictional carrier drum;

a detector for detecting whether the recording medium passes through a predetermined position; and output control means for allowing the thermal head to generate heat in accordance with an output from the detector;

wherein the auxiliary carrier members are formed at four or more positions on a sheet feed roller of the outer circumferential surface of the frictional carrier drum;

wherein, after the output from the detector, the output control means allows the thermal head to generate heat after time corresponding to a distance from the detector to the thermal head passes;

wherein the output control means predicts a slip of the recording medium with reference to at least one of the kind and size of the recording medium, and an increase and decrease in tension of a ribbon, and finely adjusts the heating timing of the thermal head based on the slip.

10. The image recording apparatus according to claim 9, further comprising the ribbon passing through between the thermal head and the frictional carrier drum, wherein the thermal head heats the ribbon and transfers a color material from the ribbon to the recording medium.

11. The image recording apparatus according to claim 9, wherein the detector is provided close to the thermal head.

12. The image recording apparatus according to claim 9, wherein the output control means estimates the increase and decrease in tension of the ribbon based on a pulse period of an encoder operatively associated with the amount of the ribbon taken out, and predicts the slip in accordance with the increase and decrease in tension of the ribbon.

13. The image recording apparatus according to claim 9, wherein the output control means predicts the slip with reference to a data table previously stored.

14. The image recording apparatus according to claim 9, wherein the recording medium includes a thermal transfer dedicated paper, a normal paper, a label paper, a transparent film, a thermal recording paper, and a thermal color recording paper.

15. The image recording apparatus according to claim 9, wherein the auxiliary carrier members include plate-shaped or spiral-shaped elastic members.

16. The image recording apparatus according to claim 9, wherein the auxiliary carrier member further comprise a function for guiding the movement of the recording medium in the rotating direction of the frictional carrier drum.

17. The image recording apparatus according to claim 9, wherein the auxiliary carrier member selects any pressure to keep close contact of the recording medium against the frictional carrier drum, depending on different recording mediums.

18. The image recording apparatus according to claim 9, wherein the auxiliary carrier member is designed to select any pressure to keep close contact of the recording medium against the frictional carrier drum, depending on different recording mediums, and wherein a link mechanism is further provided for determining any pressure common to a plurality of auxiliary carrier members to keep the recording medium in close contact with the frictional carrier drum, the link mechanism comprising:

a ring-shaped member whose the inner circumference is provided with a plurality of cam surfaces and which can rotate in a circumferential direction;

a plurality of elastic members for generating biasing force for pressing the plurality of auxiliary carrier members toward the frictional carrier drum, respectively; and a plurality of cam followers which is moved in a diametrical direction of the ring-shaped member along the plurality of cam surfaces, respectively, and which sets the biasing force to a plurality of steps by expanding and compressing the respective elastic members, or the link mechanism comprises:

elastic members for generating biasing force for pressing the plurality of auxiliary carrier members arranged around the frictional carrier drum against the frictional carrier drum, respectively;

a plurality of levers which is rotatably arranged in the vicinity of the plurality of auxiliary carrier members and which expands and compresses the elastic members; and one or more connecting members for mutually connecting the levers.

19. The image recording apparatus according to claim 9, wherein the output control means predicts the slip with reference to a data table previously stored.

* * * * *